United States Patent
Zhao et al.

(10) Patent No.: US 9,594,964 B2
(45) Date of Patent: Mar. 14, 2017

(54) VISION-BASED WET ROAD SURFACE DETECTION USING TEXTURE ANALYSIS

(71) Applicant: GM GLOBAL TECHNOLOGY OPERATIONS LLC, Detroit, MI (US)

(72) Inventors: Qingrong Zhao, Madison Heights, MI (US); Wende Zhang, Troy, MI (US); Jinsong Wang, Troy, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 338 days.

(21) Appl. No.: 14/302,622

(22) Filed: Jun. 12, 2014

(65) Prior Publication Data
US 2015/0363651 A1 Dec. 17, 2015

(51) Int. Cl.
*G06K 9/00* (2006.01)
(52) U.S. Cl.
CPC ............................ *G06K 9/00791* (2013.01)
(58) Field of Classification Search
CPC ... G06K 9/00791; B60W 40/06; B60T 8/1764
See application file for complete search history.

(56) References Cited

U.S. PATENT DOCUMENTS

| 8,436,902 | B2 * | 5/2013 | Kuehnle | G01W 1/14 348/142 |
|---|---|---|---|---|
| 2011/0109448 | A1 * | 5/2011 | Browne | B60Q 9/00 340/438 |
| 2012/0070071 | A1 * | 3/2012 | Rankin | G06K 9/00805 382/154 |
| 2013/0194410 | A1 * | 8/2013 | Topman | G06K 9/0014 348/79 |

OTHER PUBLICATIONS

Tomoaki Teshima, Hideo Saito, "Classification of Wet/Dry Area Based on the Mahalanobis Distance of Feature from Time Space Image Analysis", MVA 2009 IAPR Conference on Machine Vision Applications, May 20-22, 2009, Yokohama, Japan.

* cited by examiner

*Primary Examiner* — Siamak Harandi
(74) *Attorney, Agent, or Firm* — Quinn Law Group

(57) ABSTRACT

A method for determining a wet road surface condition for a vehicle driving on a road. A first image exterior of the vehicle is captured by an image capture device. A second image exterior of the vehicle is captured by the image capture device. A section of the road is identified in the first and second captured images. A texture of the road in the first and second images captured by a processor are compared. A determination is made whether the texture of the road in the first image is different from the texture of the road in the second image. A wet driving surface indicating signal is generated in response to the determination that the texture of the road in the first image is different than the texture of the road in the second image.

19 Claims, 4 Drawing Sheets

US 9,594,964 B2

VISION-BASED WET ROAD SURFACE DETECTION USING TEXTURE ANALYSIS

BACKGROUND OF INVENTION

An embodiment relates generally to detection of a wet road surface using texture analysis.

Precipitation on a driving surface causes several different issues for a vehicle. For example, water on a road reduces the coefficient of friction between the tires of the vehicle and the surface of the road resulting in vehicle stability issues. Typically, a system or subsystem of the vehicle senses for precipitation on the road utilizing some sensing operation which occurs when the precipitation is already negatively impacting the vehicle operation such as detecting wheel slip. Under such circumstances, the precipitation is already affecting the vehicle (e.g., wheel slip), and therefore, any reaction at this point becomes reactive. Proactive approach would be to know of the wet surface condition ahead of time as opposed in order to have such systems active which can prevent loss of control due to wet surfaces.

SUMMARY OF INVENTION

An advantage of an embodiment is the detection of stirred up water on a road using a vision-based imaging device. The technique described herein requires no excitations from the vehicle or driver for initiating a determination of whether water or precipitation is present. The technique described herein uses images captured at different instances of time and analyzes identified sections of the road for determining whether a substantial difference is present between the textures of the two captured images. If a substantial difference is present, then a determination is made the probability that the vehicle is approaching or traveling water that has been stirred up. The varying texture in the road is an indication that the textured surface of the road has changed between the captured images which are captured at instances of time that are close to one another.

An embodiment contemplates a method of determining a wet road surface condition for a vehicle driving on a road. A first image exterior of the vehicle is captured by an image capture device. A second image exterior of the vehicle is captured by the image capture device. Identifying a section of the road in the first and second captured images. A texture of the road in the first and second images captured is compared by a processor. Determining whether the texture of the road in the first image is different from the texture of the road in the second image. A wet driving surface indicating signal is generated in response to the determination that the texture of the road in the first image is different than the texture of the road in the second image.

DETAILED DESCRIPTION

Figure 1:
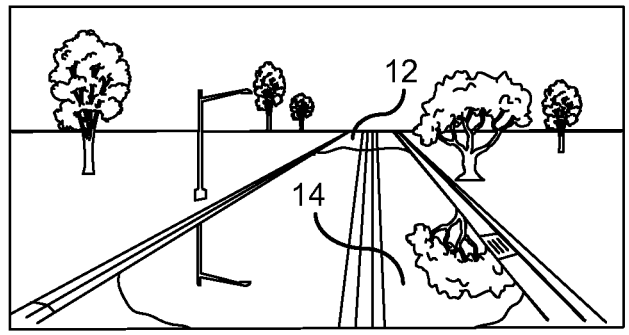
FIG. 1 is a pictorial representation of a captured wet pavement scene.

There is shown in FIG. 1, a vehicle traveling along a vehicle road 12. Precipitation 14 is shown disposed on the vehicle road 12 and is often displaced by the vehicle tires as the vehicle tires rotate over the wet vehicle road 12. It is often advantageous to know beforehand when the vehicle will be traveling along a wet vehicle road 12 so that issues resulting from precipitation, such as loss of traction or engine degradation resulting from water entering exterior air intake vents can be negated or at least mitigated.

Precipitation 14 on the vehicle road 12 can result in a reduction of traction when driving on the wet road surface. The precipitation 14 disposed on the vehicle road 12 lowers the coefficient of friction between the vehicle tires and the vehicle road 12. As a result, traction between the vehicle tires and the vehicle road 12 is lowered. Loss of traction can be mitigated by warning the driver to lower the vehicle speed to one that is conducive to the environmental conditions; actuating automatic application of the vehicle brake using a very low braking force to minimize the precipitation formed on the braking surfaces of the braking components; deactivation or restricting the activation of cruise control functionality while precipitation is detected; or notification to the driver to maintain a greater stopping distance to a lead vehicle.

Figure 2:
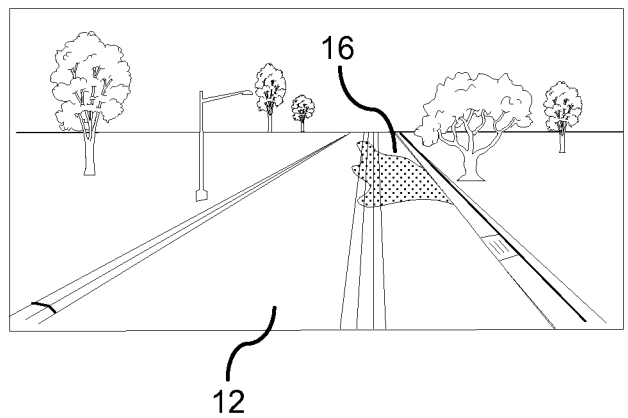
FIG. 2 is a pictorial representation of a captured dry pavement scene.

FIG. 2 illustrates a vehicle driven on a dry road having no precipitation on the road of travel. As shown, no precipitation exists on the vehicle road 12. Shadows 16 may be cast by objects such as a tree; however, shadows do not generate a reflective mirror surface. As a result, the shadow could be mistakenly construed as a texture change at different time frames. For example, if the shadow 19 is cast from the tree, and if the wind is gusting, then the shadow will have movement. As a result, the shadow could be construed as varying texture due to movement of the shadow. Therefore, it is beneficial to understand whether the surface being analyzed has a shadow cast thereon.

Figure 3:
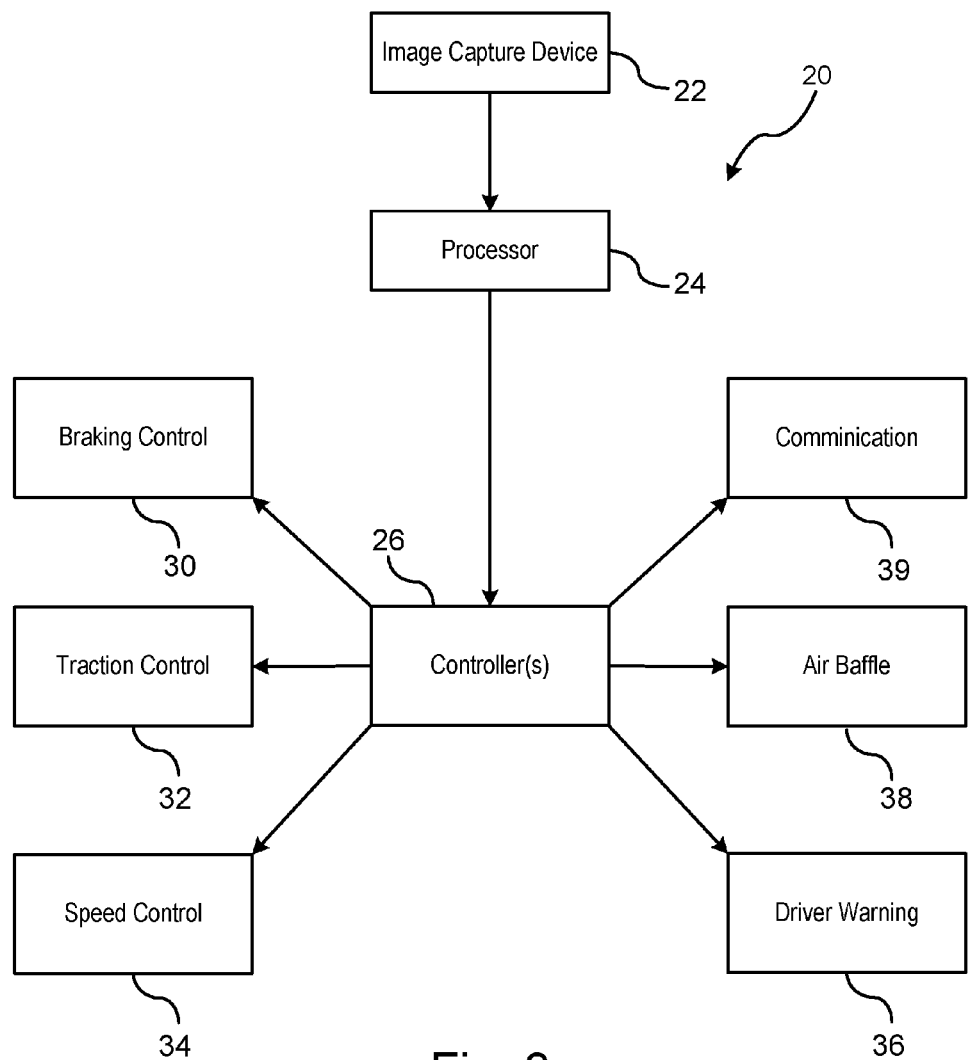
FIG. 3 block diagram of a wet road surface detection system.

FIG. 3 illustrates a block diagram of a wet road surface detection system 20. A vehicle-based image capture device 22 is mounted on the vehicle for capturing images forward of the vehicle. The image device 22 may include, but is not limited to, a camera for capturing images of the road. The function of the image capture device 22 is to capture an image that includes objects above the road and additionally the road itself for detecting a presence of water on the road of travel. The images captured by the vehicle-based image capture device 22 are analyzed for detecting water therein.

A processor 24 processes the images captured by the image capture device 22. The processor 24 analyzes reflection properties of the road of travel for determining whether water is present on the road surface.

The processor 24 may be coupled to one or more controllers 26 for initiating or actuating a control action if precipitation is found to be on the road surface. One or more countermeasures may be actuated for mitigating the effect that the precipitation may have on the operation of the vehicle.

The controller 26 may be part of the vehicle subsystem or may be used to enable a vehicle subsystem for countering the effects of the water. For example, in response to a determination that the road is wet, the controller 26 may enable an electrical or electro-hydraulic braking system 30 where a braking strategy is readied in the event that traction loss occurs. In addition to preparing a braking strategy, the braking system may autonomously apply a light braking force, without awareness to the driver, to remove precipitation from the vehicle brakes once the vehicle enters the precipitation. Removal of precipitation build-up from the wheels and braked maintains an expected coefficient of friction between the vehicle brake actuators and the braking surface of the wheels when braking by the driver is manually applied.

The controller 26 may control a traction control system 32 which distributes power individually to each respective wheel for reducing wheel slip by a respective wheel when precipitation is detected on the road surface.

The controller 26 may control a cruise control system 34 which can deactivate cruise control or restrict the activation of cruise control when precipitation is detected on the road surface.

The controller 26 may control a driver information system 36 for providing warnings to the driver of the vehicle concerning precipitation that is detected on the vehicle road. Such a warning actuated by the controller 26 may alert the driver to the approaching precipitation on the road surface and may recommend that the driver lower the vehicle speed to a speed that is conducive to the current environmental conditions, or the controller 26 may actuate a warning to maintain a safe driving distance to the vehicle forward of the driven vehicle. It should be understood that the controller 26, as described herein, may include one or more controllers that control an individual function or may control a combination of functions.

The controller 26 may further control the actuation of automatically opening and closing air baffles 38 for preventing water ingestion into an engine of the vehicle. Under such conditions, the controller 26 automatically actuates the closing of the air baffles 38 when precipitation is detected to be present on the road surface in front of the vehicle and may re-open the air baffles when precipitation is determined to no longer be present on the road surface.

The controller 26 may further control the actuation of a wireless communication device 39 for autonomously communicating the wet pavement condition to other vehicles utilizing a vehicle-to-vehicle or vehicle-to-infrastructure communication system.

The advantage of the techniques described herein is that no excitations are required from the vehicle or driver for initiating a determination of whether water or precipitation is present. That is, prior techniques require some considerable excitation by the vehicle whether by way of a braking maneuver, increased acceleration, steering maneuver so as for surface water detection. Based on the response (e.g., wheel slip, yawing), such a technique determines whether the vehicle is currently driving on water or precipitation. In contrast, the techniques described herein provide an anticipatory or look-ahead analysis so as to leave time for the driver or the vehicle to take precautionary measures prior to the vehicle reaching the location of the water or precipitation.

Figure 4:
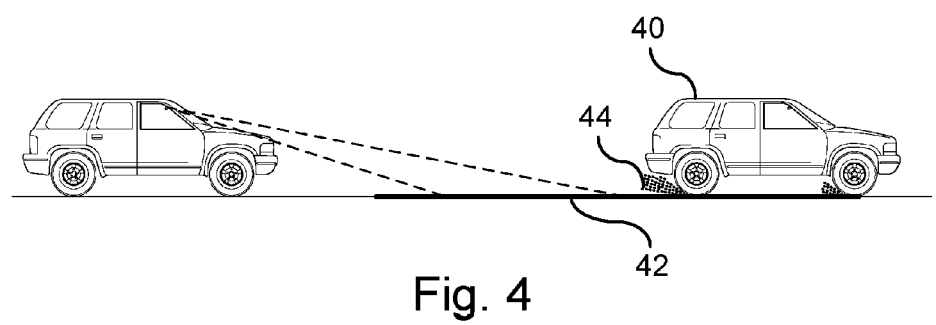
FIG. 4 is a pictorial illustration of a vehicle stirring water on a wet pavement.

FIG. 4 illustrates pictorial illustration of a vehicle traveling along the road of travel where the surface of the road is wet. Typically when driving along a dry road surface, the texture of the road surface is substantially uniform. Surfaces roads constructed of cement or asphalt typically have a substantially uniform texture. While it is understood that the small deviations may be present texture of road at various times, such roads will exhibit substantial uniformity through the course of the road.

When a vehicle 40 travels along a road having water disposed thereon, water is splashed up by the vehicle tires as the vehicle travels through standing water 42 on the road. As the water is diffused into the air and back onto the ground surface, generally represented as 44, the water enters a stirred-state as opposed to a still-state. When in a still-state, the water has mirror-effect reflective properties and real life objects are reflected in the water.

As the water is stirred-up, the reflective properties of water decrease as light signals are diffused in different directions due to the stirred-effect of the water. As a result, the texture of the water will be different. Therefore, the road is analyzed at multiple subsequent time frames for analyzing a texture of the road surface. If a road surface exhibits a varying texture along in each of the subsequent frames, then a determination is made that precipitation is formed on the road surface.

Figure 5A:
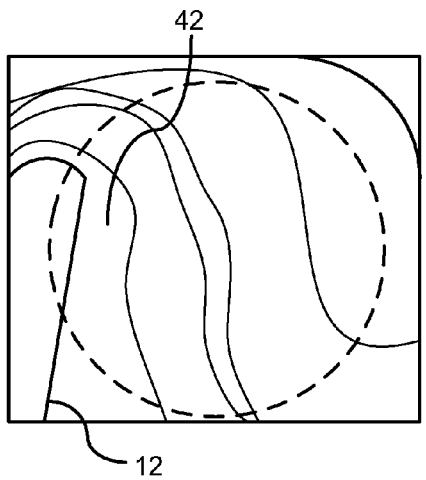
FIG. 5a is an exemplary captured image of a stirred water road surface at a first instance of time.
Figure 5B:
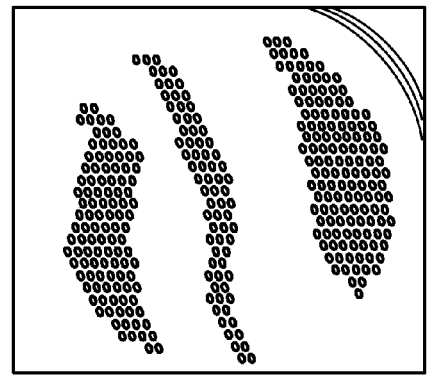
FIG. 5b is an exemplary graphical patterned precipitation of the road surface as the first instance of time.

FIGS. 5a-5b and 6a-6b illustrate varying texture within captured images taking along a course of travel. In FIG. 5a, an image captured at a first instance of time exterior of the vehicle with stirred-up water 42 on the road surface 12. FIG. 5b illustrates a graphic illustrating a texture analysis of the road. As shown in FIG. 5b, a respective texture pattern of precipitation is shown on the surface of the road.

Figure 6A:
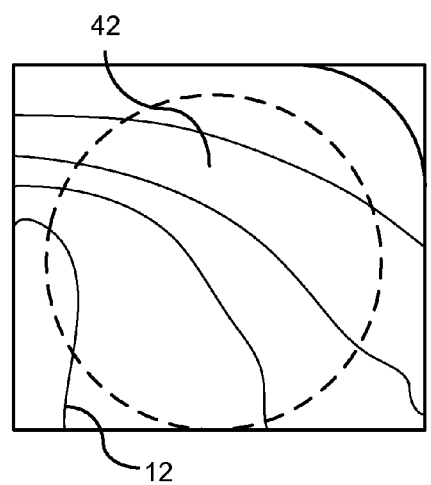
FIG. 6a is an exemplary captured image of a stirred water road surface at a second instance of time.
Figure 6B:
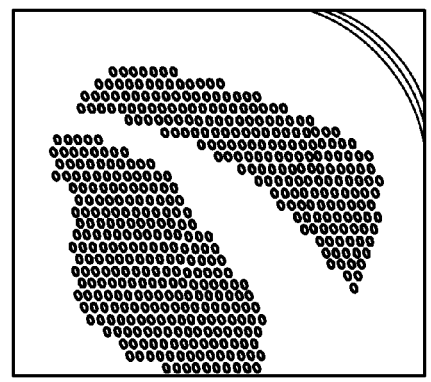
FIG. 6b is an exemplary graphical patterned precipitation of the road surface as the second instance of time.

FIG. 6a illustrates an image captured at a second instance of time exterior of the vehicle with stirred-up water 42 on the road surface 12. FIG. 6b illustrates a graphic illustrating a texture analysis of the road for the captured image at the second instance of time. In comparing graphic analysis between FIGS. 5b and 6b, it showed that there are differentiating patterns in the texture between the two images captured at different instances of time. As a result a determination can be preliminarily made that water is present on the road surface.

In response to the determination that water may preliminarily be present on the road surface, shadow analysis may be conducted for eliminating shadows on the ground surface. Typically, shadow analysis involves detecting a presence of a shadow. As described earlier, if a shadow is present on the road surface and if the object casting the shadow moves, then a difference detected in texture may be the result of a shadow moving on the road surface. As a result, the technique performs shadow analysis to eliminate the possibility that the detected texture change in a different time frame is not the result of shadow movement. Therefore, if a shadow is detected, then further analysis of the texture will be performed since an assumption is made that the shadow is causing the change in the texture over different time frames.

Figure 7:
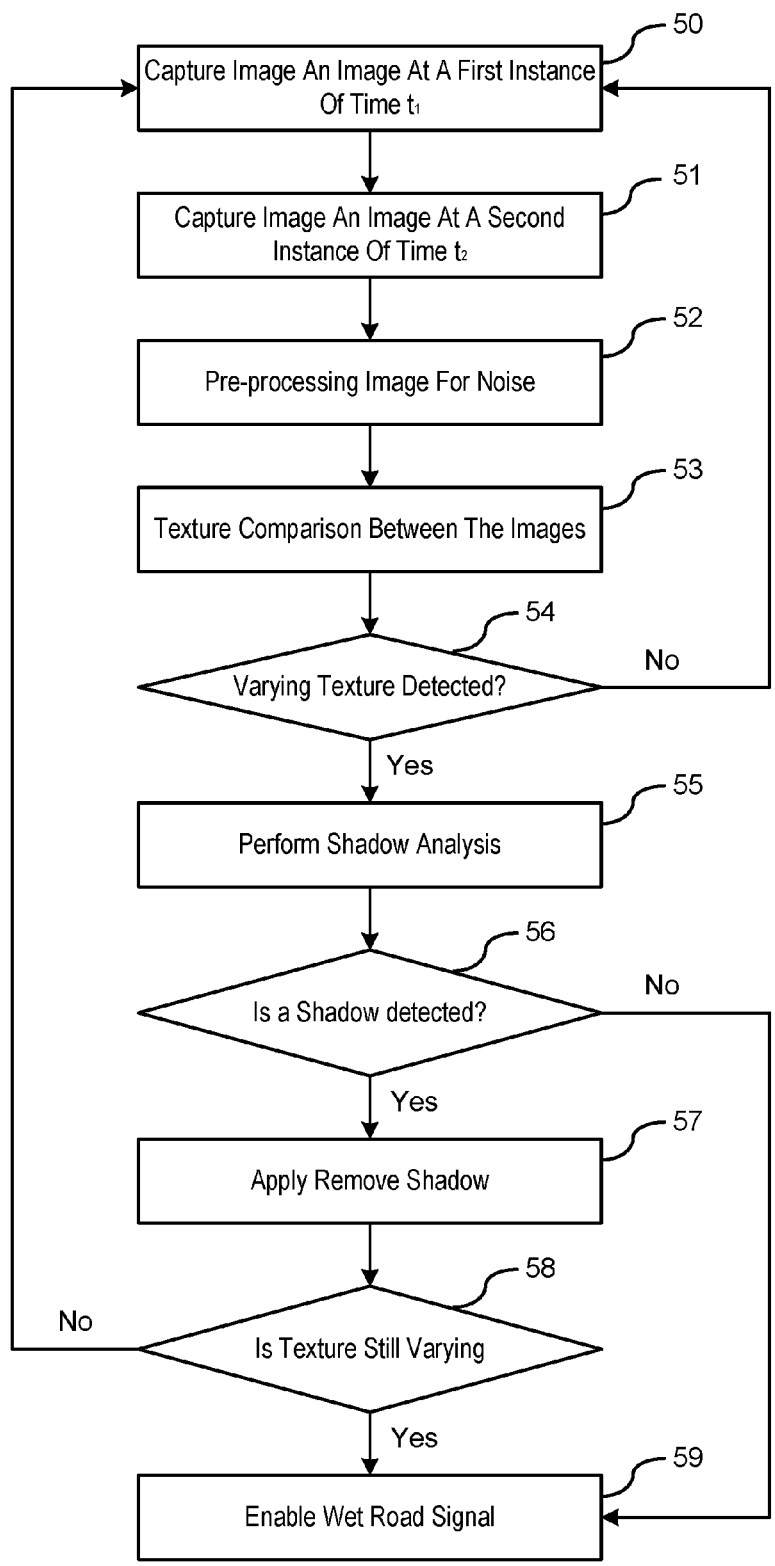
FIG. 7 is a flowchart of a method for determining present of water on a road surface.

FIG. 7 illustrates a flowchart of a method for determination the presence of water on the road as a result of varying road surface textures. In block 50, an image is capture at a first instance of time.

In block 51, an image is captured at a second instance of time. The time at which the images are taken from one another may be dependent on vehicle speed. For example, if a vehicle is traveling at a slow rate of speed (e.g., less than 25 mph), the longer delay may be used between taking pictures as opposed to a vehicle traveling at speeds greater than 25 mph. That is, the faster the vehicle is traveling, the less time that elapses between the times when the images are captured.

In block 52, pre-processing is performed on the captured images. Preprocessing includes noise removal for image enhancement which involves removing noise from the images so that image is cleaner for identifying objects and feature points in the respective captured images. Images taken with a digital imaging device may pick up noise from a variety of sources. For example, for sparse light in images, pixels in the image may have varying color or intensity from their surrounding pixels. As a result, these noisy pixels have no correlation or relation to a color of surrounding pixels. Generally this type of noise may only have a small effect on the overall image, and as a result, it may be removed from the image so that analyzing the object and feature points may be efficiently analyzed.

In block 53, texture comparison is performed on the image captured at the first instance of time and the second instance of time. Various techniques can be applied to perform texture comparison that include, but are not limited to, spatial sizing of the of relationships between pixels within a region, edge detection, length of texture features, texture co-occurrence matrices, laws texture energy measures, autocorrelation and power spectrum models, and texture segmentation. Spatial sizing involves a structured approach wherein the image texture is viewed as a set of primitive pixels in some regular or repeated pattern. In contrast, a technique like edge detection is a statistical approach that views the image texture as a quantitative measure of the arrangement of intensities of pixels in a respective region. In response to detecting edges in the image, the direction of the edges is applied as a characteristic of texture and is used in determining patterns in the texture. This can be represented as an average or in a histogram.

Co-occurrence matrices capture numerical features of a texture using spatial relations of similar gray tones. Such numerical features determined from the co-occurrence matrix can be used to compare and classify textures.

Laws texture energy measures generates a convolution mask used to compute the energy of texture which is then represented by a nine element vector for each pixel.

Texture segmentation divides region of the texture into segments. Two main types of segmentation include region-based segmentation and boundary-based segmentation. Region-based segmentation clusters pixels are based on texture properties whereas boundary-based segmentation cluster pixels are based on edges between pixels that have different texture properties.

In block 54, a determination is made as to whether varying texture is detected. If varying texture is not detected, a return is made to step 50 to capture a next set of images. If a determination is made that the texture varies, then the routine proceeds to step 55.

In block 55, shadow analysis is performed on the image. The various techniques describe herein describe processes for detecting shadows. While the references describe removing a shadow, the analysis for detecting the shadow described in the references may be utilized herein. Some of the techniques for shadow detection that may be used are described in U.S. Pat. No. 8,294,794 entitled "Shadow Removal In An Image Captured By A Vehicle-Based Camera For Clear Path Detection" issued Oct. 23, 2012; U.S. Pat. No. 8,319,854 entitled "Shadow Removal In An Image Captured By A Vehicle Based Camera Using Non-Linear Illumination-Invariant Kernel" issued Nov. 27, 2012; and "Shadow Removal In An Image Captured By A Vehicle-Based Camera Using An Optimized Oriented Linear Axis" issued Jan. 1, 2013, each of a which are incorporated by reference in their entirety.

In block 56, a determination is made whether the shadow is present in the image. If a shadow is not detected, then the routine proceeds to step 59, otherwise the routine proceeds to step 57.

In block 57, in response to a detection of a shadow in the image, the shadow is removed from the image.

In block 58, a determination is made whether the texture of the road surface varies with the shadow removed. If the determination made that the texture varies, that the routine proceeds to block 59; otherwise the routine returns to block 50 to capture and analyze a next captured image.

In block 59, a wet surface signal is enabled. The wet surface signal may be a signal that warns the driver of a condition or an action or non-action to perform. The wet surface signal may further be a signal that enables or alerts a vehicle subsystem or system of the road condition that so that subsystem or system is aware of the approaching road condition.

While certain embodiments of the present invention have been described in detail, those familiar with the art to which this invention relates will recognize various alternative designs, filtering process and embodiments for practicing the invention as defined by the following claims.

What is claimed is:

1. A method for determining a wet road surface condition for a vehicle driving on a road, the method comprising the steps of:
    capturing a first image exterior of the vehicle by an image capture device;
    capturing a second image exterior of the vehicle by the image capture device;
    identifying a section of the road in the first and second captured images;
    comparing a texture of the road in the first and second captured images by a processor;
    determining whether the texture of the road in the first image is different from the texture of the road in the second image; and
    generating a wet driving surface indicating signal in response to the determination that the texture of the road in the first image is different than the texture of the road in the second image.

2. The method of claim 1 the first image and the second image are captured at different instances of time.

3. The method of claim 2 wherein the first image and the second image are successive captured images.

4. The method of claim 3 further comprising the steps of:
    determining that the texture of the road is the same between the first image and the second image:
    capturing a next successive image;
    comparing the next successive image to a previous image for determining whether the texture in the next successive image is different than the texture from the previous image.

5. The method of claim 1 wherein a comparison of the texture of the road surface is identified using a structured technique.

6. The method of claim 1 wherein a comparison of the texture of the road surface is identified using a statistical technique.

7. The method of claim 6 wherein the statistical technique includes a co-occurrence matrices technique.

8. The method of claim 6 wherein the statistical technique includes a Laws texture energy technique.

9. The method of claim 6 wherein the statistical technique includes a texture segmentation technique.

10. The method of claim 1 further comprising the steps of pre-processing the first and second captured images for removing noise from each of the images prior to performing a comparison of the texture.

11. The method of claim 1 further comprising the steps of:
applying shadow analysis in response to a determination that the texture of the first image and the texture of the second image are different;
detecting an identified shadow from the first and second captured image in response to detecting a respective shadow; and
excluding detected changes in the texture from further analysis that are a result of a detected shadow.

12. The method of claim 1 wherein a respective region of the first image and a respective region of the second image are identified for comparing the texture of the road in the first image and second image.

13. The method of claim 1 wherein determining a difference in the texture of the road between the first image and the second image includes determining a substantial variation in the texture between the first image and the second image.

14. The method of claim 1 wherein the wet driving surface indicating signal is used to warn a driver of water on the road surface.

15. The method of claim 1 wherein the wet driving surface indicating signal alerts a driver of the vehicle against a use of cruise control.

16. The method of claim 1 wherein the wet driving surface indicating signal alerts a driver to reduce a vehicle speed.

17. The method of claim 1 wherein the wet driving surface indicating signal is provided to a vehicle controller for shutting baffles on an air intake scoop of a vehicle for preventing water ingestion.

18. The method of claim 1 wherein the wet driving surface indicating signal is provided to a vehicle controller, the controller autonomously actuating vehicle braking for mitigating condensation build-up on vehicle brakes.

19. The method of claim 1 wherein the wet driving surface indicating signal is provided to a wireless communication system for alerting other vehicles of the wet road surface condition.

* * * * *